United States Patent
Wagner et al.

(10) Patent No.: US 6,925,985 B2
(45) Date of Patent: Aug. 9, 2005

(54) METHOD AND DEVICE FOR CONTROLLING THE SPEED OF AN INTERNAL COMBUSTION ENGINE

(75) Inventors: Horst Wagner, Stuttgart (DE); Reudiger Fehrmann, Leonberg (DE); Bjoern Bischoff, Korntal-Muenchingen (DE); Sabine Heinze, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/473,510

(22) PCT Filed: Nov. 25, 2002

(86) PCT No.: PCT/DE02/04311
§ 371 (c)(1),
(2), (4) Date: Mar. 31, 2004

(87) PCT Pub. No.: WO03/067342
PCT Pub. Date: Aug. 14, 2003

(65) Prior Publication Data
US 2004/0149259 A1 Aug. 5, 2004

(30) Foreign Application Priority Data
Feb. 9, 2002 (DE) .......................................... 102 05 375

(51) Int. Cl.$^7$ ............................................... F02D 31/00
(52) U.S. Cl. ................................. 123/357; 123/198 DB
(58) Field of Search ......................... 123/357, 198 DB, 123/358, 359, 500, 501; 701/115

(56) References Cited

U.S. PATENT DOCUMENTS

| | | | | |
|---|---|---|---|---|
| 3,867,918 A | * | 2/1975 | Williams et al. | 123/357 |
| 4,422,420 A | * | 12/1983 | Cromas et al. | 123/352 |
| 4,566,414 A | * | 1/1986 | Sieber | 123/357 |
| 4,589,391 A | * | 5/1986 | Sieber et al. | 123/357 |
| 4,709,335 A | * | 11/1987 | Okamoto | 701/104 |
| 5,417,193 A | * | 5/1995 | Fillman et al. | 123/352 |
| 6,512,974 B2 | * | 1/2003 | Houston et al. | 701/115 |
| 6,595,180 B2 | * | 7/2003 | Thompson et al. | 123/198 DB |
| 6,678,608 B2 | * | 1/2004 | Jankovic et al. | 701/115 |

FOREIGN PATENT DOCUMENTS

| | | |
|---|---|---|
| DE | 40 16 018 | 8/1991 |
| DE | 197 11 787 | 12/1997 |
| DE | 100 10 377 | 9/2000 |
| EP | 0 554 479 | 8/1993 |

* cited by examiner

Primary Examiner—Carl S. Miller
(74) Attorney, Agent, or Firm—Kenyon & Kenyon

(57) ABSTRACT

A device and a method for controlling an internal combustion engine, for example, for regulating the speed of the internal combustion engine, are described. At least one first governor, specifies a first manipulated variable based on a comparison between a first setpoint value and an actual value. At least one second governor specifies a second manipulated variable based on a comparison between a second setpoint value and the actual value. The first manipulated variable may be limited to a first manipulating range and the second manipulated variable may be limited to a second manipulating range.

14 Claims, 3 Drawing Sheets

METHOD AND DEVICE FOR CONTROLLING THE SPEED OF AN INTERNAL COMBUSTION ENGINE

FIELD OF THE INVENTION

The present invention relates to a method and a device for controlling an internal combustion engine, for example, for regulating the speed of the internal combustion engine.

BACKGROUND INFORMATION

In some methods and devices for controlling an internal combustion engine, for example, for regulating the speed of the internal combustion engine, there is interaction between at least one idle speed governor and one manipulated variable, that of the driver command, which is detected via a gas pedal position. In the process, a controlled variable corresponding to the driver command torque, which is determined by the gas pedal position, and a manipulated variable of a governor corresponding to the torque of the idle speed governor, work together. The controlled variable, i.e., the driver command torque, should override the idle speed governor, i.e., the torque of the idle speed governor. Overriding means that the idle speed governor does not have any effect on the controlled variable if the driver command torque is greater than the torque of the idle speed governor. As a result, the speed may be increased when the driver steps on the accelerator. The governor is supposed to prevent the speed from falling below the idling speed. In this case, if the driver does not accelerate, the governor overrides the controlled variable.

This means that for different functionalities, a permissible speed interval should be maintained using regulation, in the course of which a controlling intervention should be possible, for example, by the driver.

SUMMARY OF THE INVENTION

It may be advantageous when at least one first governor specifies a first manipulated variable on the basis of a comparison between a first setpoint value and an actual value, and at least one second governor specifies a second manipulated variable on the basis of a comparison between a second setpoint value and the actual value, and the first manipulated variable is limited to a first manipulating range and the second manipulated variable is limited to a second manipulating range.

This means that first governors that deliver the manipulated variables within a particular manipulating range may be provided, while second governors deliver manipulated variables only within a second manipulating range. Both first and second governors may be designed as proportional governors or as proportional and integral governors.

It may be advantageous when the first manipulated variable is limited in such a way that the parameter to be regulated decreases and the second manipulated variable is limited in such a way that the variable to be regulated increases. In the example of a governor that regulates this via the quantity of fuel, this means that the first governor may reduce the quantity of fuel and the second governor may increase the quantity of fuel.

Depending on the requirements set for the governor, different setpoint values may be specified. It may be advantageous when the setpoint values are specified as a function of the operating state. Here, the first setpoint value is greater than or equal to the second setpoint value.

In order to avoid an undesired behavior of the control circuit, in case both control units provide a manipulated variable, the manipulated variable representing the greatest absolute-value change may be used for control. In this case, it may be advantageous for the manipulated variable of the other governor, i.e., of the governor representing the smallest absolute-value change, to be frozen.

Furthermore, there may be implementations in the form of a computer program having program code means and in the form of a computer program product having program code means. The computer program according to the present invention may have program code means for performing all the steps of the method according to the present invention when the program is executed on a computer, for example, a control unit for an internal combustion engine of a motor vehicle. In this case, the present invention may thus be implemented through a program stored in the control unit so that this control unit provided with the program may represent the method for whose execution the program is suitable. The computer program product according to the present invention may have program code means stored on a computer-readable storage medium in order to execute the method according to the present invention when the program product is executed on a computer, for example, a control unit for an internal combustion engine of a motor vehicle. In this case, the present invention may thus be implemented through a storage medium so that the method according to the present invention may be executed when the program product or the storage medium is integrated into a control unit for an internal combustion engine, for example, of a motor vehicle. For example, an electric storage medium, such as a read-only-memory (ROM), an EPROM, or an electric permanent memory, such as a CD-ROM or DVD, may be used as a storage medium or as a computer program product.

DETAILED DESCRIPTION

Figure 1:
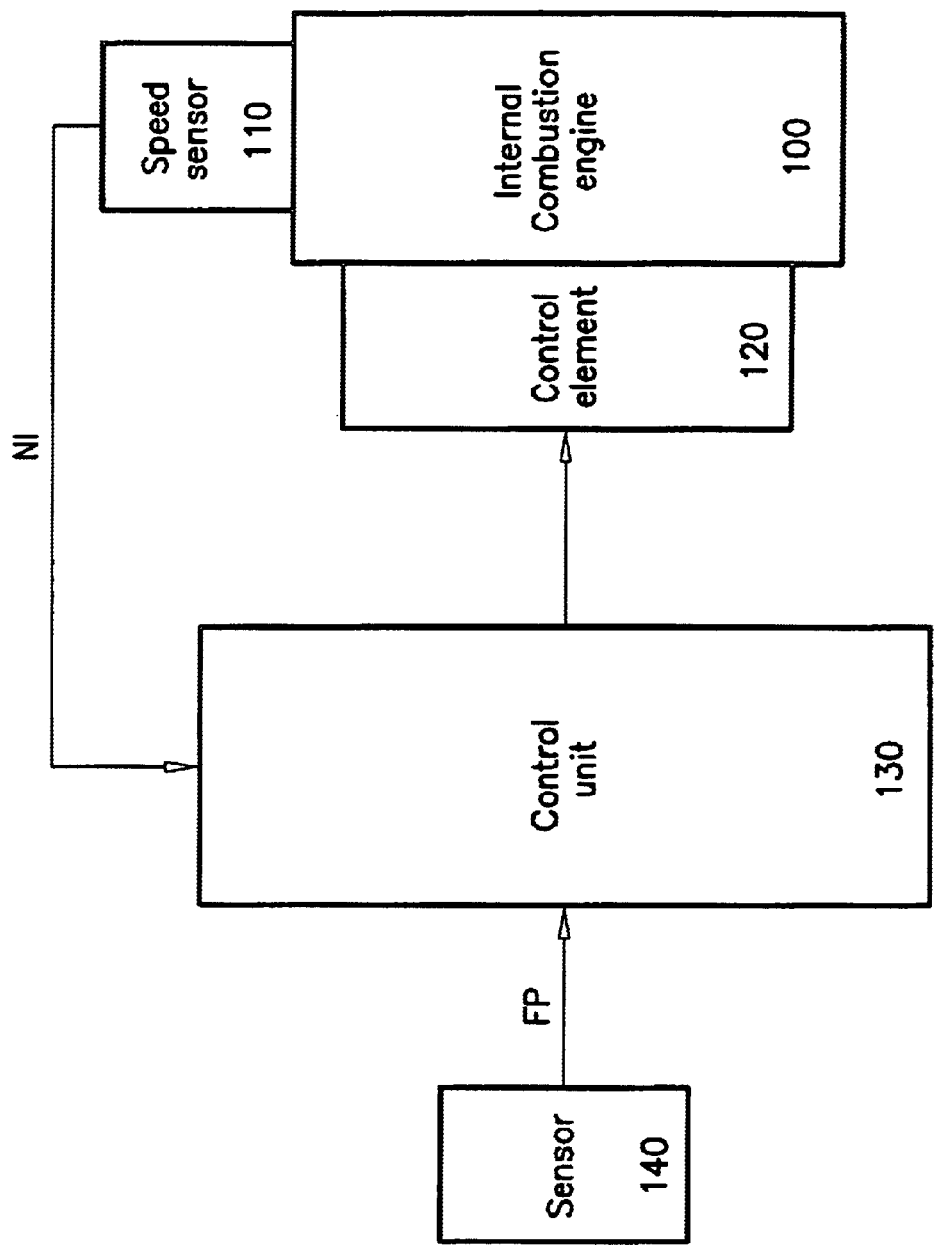
FIG. 1 shows a block diagram of example embodiment of a device for controlling an internal combustion engine.

An example embodiment of a device for controlling an internal combustion engine is illustrated in FIG. 1. The internal combustion engine is labeled 100. Various sensors that record the different signals are positioned on the internal combustion engine. For example, a speed sensor 110 is provided, which delivers a signal NI that corresponds to the measured speed of the internal combustion engine.

Furthermore, different control elements 120 that influence the power output of the internal combustion engine, and consequently, the speed of the internal combustion engine, may be positioned on internal combustion engine 100. For example, control elements 120 may be provided, which control the torque provided by the internal combustion engine, for example, via the quantity of fuel injected.

Control element 120 may be subjected to control signals from a control unit 130. Output signal NI of sensor 110 reaches control unit 130. Furthermore, signals from other sensors 140 may be supplied to control unit 130. They include, for example, a signal FP that characterizes the driver command. A gas pedal position sensor is, for example, used for this purpose.

Based on driver command FP and actual speed NI, this control unit computes a control signal to be supplied to control elements 120. To regulate and/or control the speed, for example, in diesel engines, an idle speed governor, a working speed governor, a vehicle-speed governor, a final speed governor, a maximum speed governor, a general governor and/or a governor, may be provided. For example, the final speed governor, the working speed governor, and/or the vehicle-speed governor may be used for maintaining an upper speed limit. The idle speed governor ensures that the speed of the internal combustion engine does not drop below the idling speed. The vehicle speed governor causes the speed to maintain a certain value that corresponds to the desired vehicle speed. The working speed governor similarly ensures that the speed does not drop below a desired working speed.

The final-speed governor and the maximum-speed governor may ensure that an upper speed limit is maintained. The final-speed governor may ensure, for example, that a maximum permissible speed is not reached. The maximum speed regulation ensures that a speed corresponding to a desired maximum speed or a permissible maximum speed is not exceeded. The special case in which the upper speed limit corresponds to the lower speed limit may exist, for example, when, in an automated gearbox, a speed determined for the gearshift operation is adjusted through the S general governor. The same also applies to a governor when the driver setting of the driver command is interpreted as a setpoint speed. This applies, for example, to special applications in the commercial vehicles.

Each of the mentioned functionalities is normally implemented by its own governor. In general, these governors have different points of intervention. Problems may occur when several governors are intervening simultaneously. This may result in instabilities. Furthermore, problems may appear when switching from one functionality to the other. An example is the replacement of the idle speed control by a working speed control. In this case, the problem is for the actuator intervention of the first governor to be suitably accepted in the second governor. This means that the initialization of the individual governors during the transition may be problematic.

A speed interval governor according to the present invention, may prevent the speed interval from being exited irrespective of the controlling intervention of the governors. In the special case of interval width 0, the governor fully compensates for the control intervention to maintain the desired speed. In the general case of an infinite interval width, the governor behaves neutrally, if at all possible, when the speed is found within the interval limits on account of the controlling intervention or on account of other interfering variables. If the interval limits are suitably interconnected, i.e., the setpoint values are suitably specified, such a speed governor may be in a position to implement all or only a part of the above-mentioned functionalities.

The advantage here is that resources may be saved in the control unit as well as in development and calibration, since only one governor is required. Improvements to be made for one functionality are also of benefit to the other functionalities. In the event of competing functionalities, clear prioritizing may take place on the level of determining the setpoint value. Overlapping intervention of several governors is out of the question. The replacement of one functionality by another is simpler to ensure. Initialization may take place only in one governor, and not in several governors.

According to the present invention, a speed interval governor is implemented by a parallel structure of two governors. The two parallel governors may have a PI character. One of the two governors regulates to an upper interval limit as upper setpoint value NSO. The other governor regulates to the lower interval limit as lower setpoint value NSU. In each of the signal paths, the actuator intervention is limited in such a way that the permissible setpoint value interval is not exited.

Assuming a positive point-to-point behavior, i.e., an increase of the manipulated variable may result in an increase of the controlled variable, this means that for the two control paths, the control path for the lower speed limit intervenes to increase the speed. The lower limit of its actuator intervention is consequently 0. The actuator intervention permissible at the current operating point may function as an upper limit. The control path for the upper speed limit may intervene to decrease the speed. The upper limit of its actuator intervention is 0. The instantaneous control value for the actuator intervention, for instance, may be used as a lower limit. This ensures that if the upper interval limit is exceeded, the controlling actuator intervention may be compensated by the governor intervention. Through the combined effect of the two control paths, speed-increasing as well as speed-decreasing interventions are possible. This also applies when the upper and the lower interval limits are the same, i.e., upper setpoint value NSO and lower setpoint value NSU are the same. With these setpoint values, a pure speed regulation may be implemented using the same structure. Thus, for instance, overriding the control value in a transmission control is possible.

Figure 2:
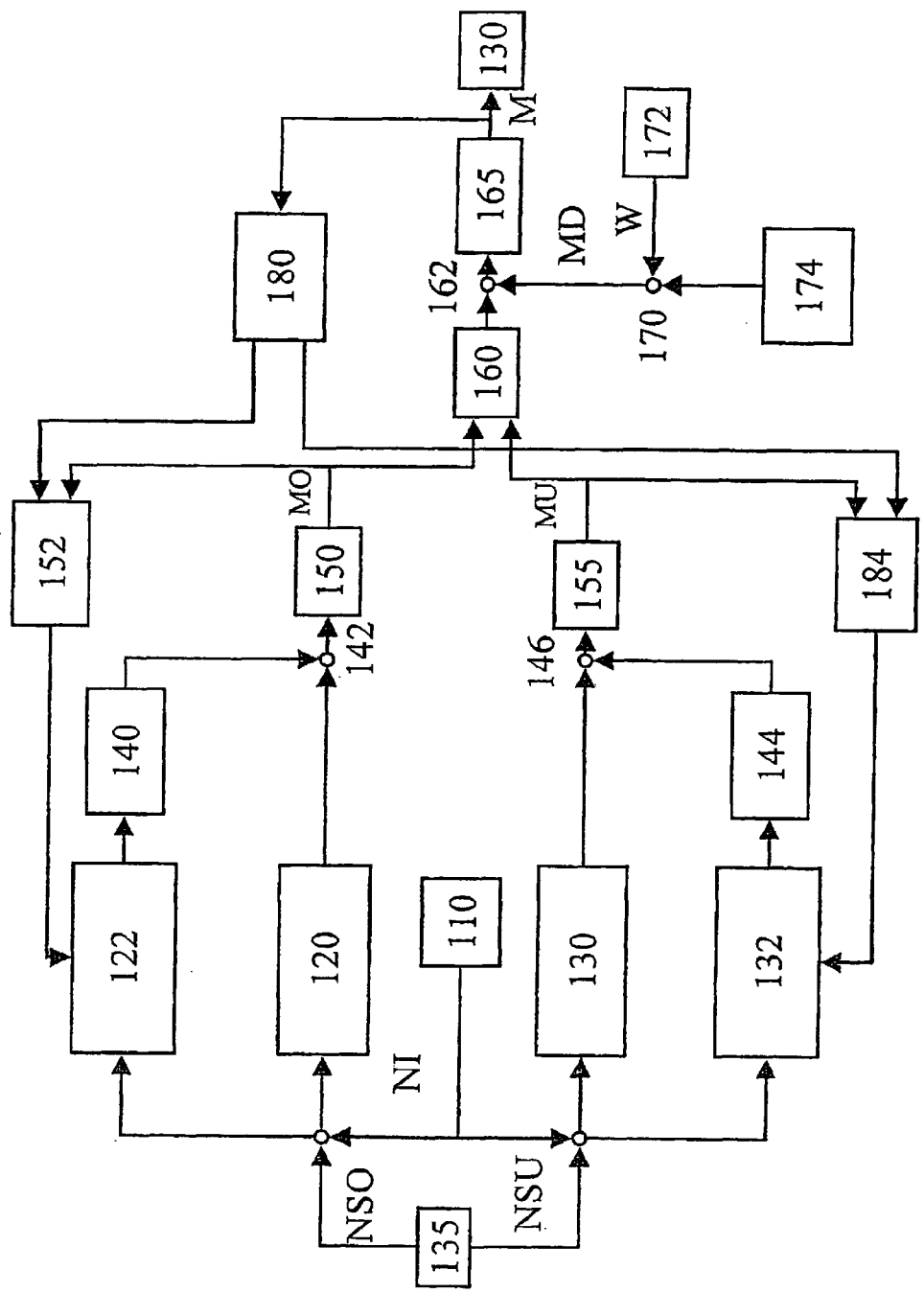
FIG. 2 shows an illustration of an exemplary embodiment of the control structure according to the present invention.

A corresponding governor structure is illustrated as a block diagram in FIG. 2. Elements already described in FIG. 1 are marked with the same reference numbers. Output signal NI of speed sensor 110 reaches a first P-component 120 and a first I-component 122 through a first node 115. Furthermore, through a second node 125, this signal reaches a second P-component 130 and a second I-component 132.

A first output signal NSO of a setpoint value setting 135 is applied to the second entrance of first connecting point 115, while output signal NSO of setpoint value generator 135 is applied to second node 125.

The output signal of the first integral component 122 reaches a node 142 through a first limiter 140. The output signal of first P-component 120 is applied to the second input of node 142. Via a second limiter 144, the output signal of second integral component 132 reaches a node 146, to whose second input the output signal of second proportional component 130 is applied.

The output signal of node 142 is received by a first manipulated variable limiter 150, whose output signal MO reaches reactive current compensating circuit 160. A second manipulated variable limiter 155, whose output signal MU likewise reaches reactive current compensating circuit 160, receives the output signal of node 146. Via a node 162, the output signal of reactive current compensating circuit 160 reaches signal limiter 165, whose output signal M is received by control element 130, or which a signal is computed and supplied to control element 130.

The output signal of a node 170, which receives output signal W of a weighting generator 172 and the signal of a differential component 174 is applied to the second input of node 162.

The output signal of the manipulated variable limiter 165 reaches a start value generator 180, whose signal is in turn received by a first start value generator 182 and a second start value generator 184. Output signal MO of the first manipulated variable limiter is supplied to first start value generator 182. Similarly, output signal MU of second manipulated variable limiter 155 is supplied to second start value generator 184.

Integral component 122, first limiter 140, and proportional component 120 form a first governor that regulates the speed to upper interval limit NSO. Manipulated variable limiter 150 limits the output signal of this governor to negative values, i.e., this governor only has only torque-reducing intervention. This means that the upper threshold of this limiter assumes the value 0.

Proportional component (P-component) 130 and integral component (I-component) 132, as well as second limiter 144 form a second governor, which regulates the speed to lower interval limit NSO. Here, limiter 155 is designed in such a way that this governor may only perform torque-increasing interventions, i.e., the output signal MO of this governor branch may be limited in such a way that the smallest possible value is 0.

Starting from these two manipulated variables MU and MO, reactive currect compensating circuit 160 then selects the corresponding manipulated variable. This may be corrected in node 162 using the weighted output signal of D-component 174. The use of D-component 174 results in improved quality of control. In the event of setpoint value jumps or transient behavior at an interval limit, this D-component may have a positive effect on the governor behavior. This correction takes place only in selected operating states.

If the difference between lower interval limit NSO and upper interval limit NSU is small, i.e., if the difference between lower setpoint value NSU and upper setpoint value NSO is small, for example, when the two setpoint values are equal, it may be prevented that both control paths become dynamically active at the same time in certain operating states, i.e., that both specify a torque command. This is may be ensured via reactive current compensating circuit 160. Control interventions of both control paths, for example, in the same direction, i.e., with a change of control intervention in the same direction, are to be avoided since this results in both control amplifications being added. If each control path is properly laid out, overlapping of both control paths in the same direction would result in an unstable behavior due to high circuit amplification.

The following procedure may be used for impressing the control interventions onto the parallel control circuits. If changes in the same direction are made to the actuator interventions, the path that exhibits the change that is greater in absolute value is dynamically impressed, i.e., used to drive the control element. The integrator of the other path is set through corresponding start value generator 182 or 184 in such a way that the intervention last effective for the current system deviation appears again. The inactive path may therefore be virtually frozen.

Figure 3:
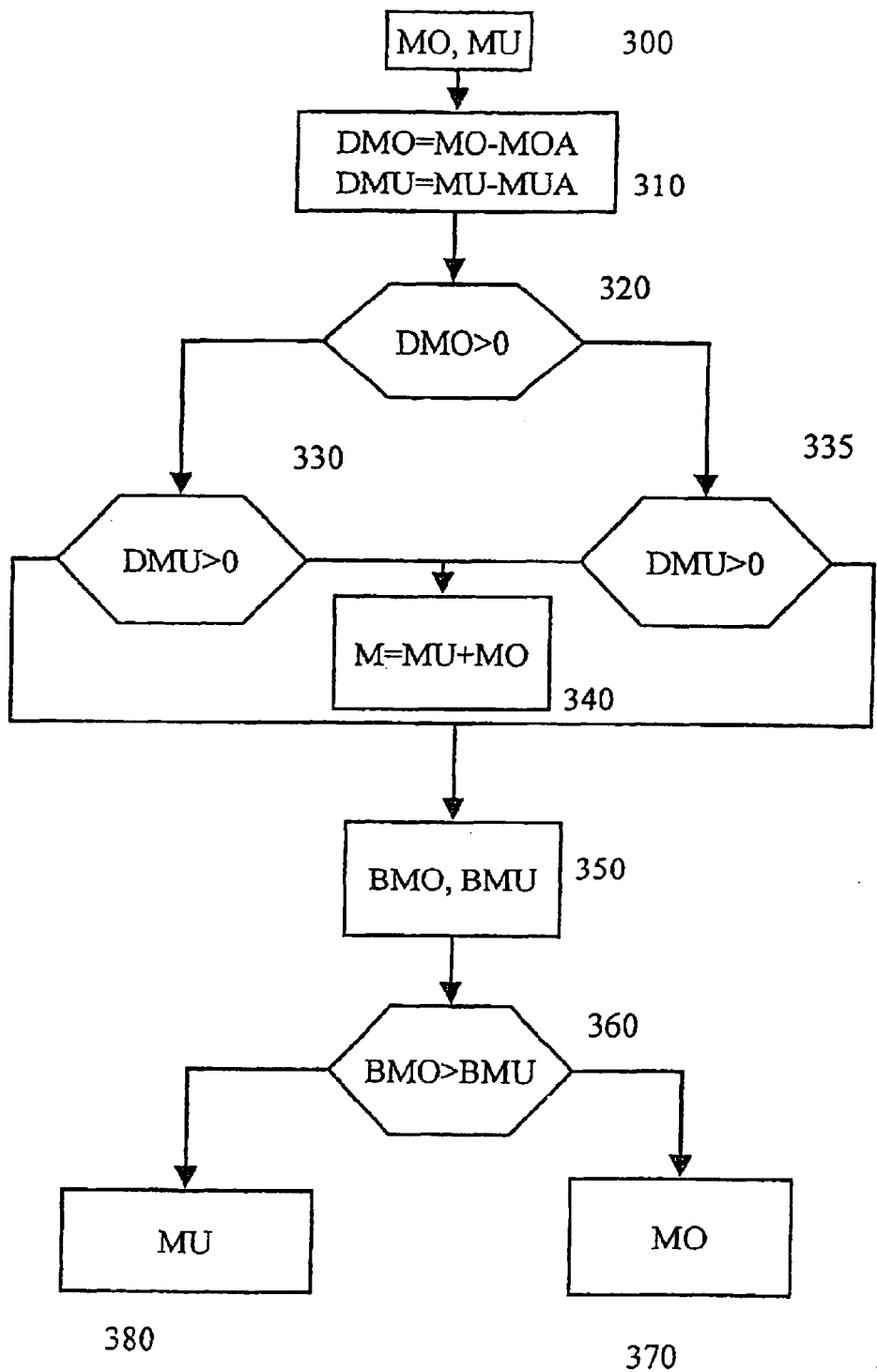
FIG. 3 shows a flow chart to illustrate an exemplary embodiment of the process according to the present invention.

An exemplary embodiment of a corresponding procedure is shown in FIG. 3.

In a first step 300, blocks 120, 122, 140 and 142 determine manipulated variable MO of the first path and blocks 130, 132, 144, and 146 determine manipulated variable MU of the second path. Subsequently in step 310, difference DMO between new manipulated variable MO and manipulated variable MOA calculated during the last computation is determined. Difference DMO of the second control circuit, based on current value MU and the preceding MUA, is similarly determined. Subsequent query 320 examines whether difference DMO of the first control circuit is greater than 0, i.e., whether manipulated variable MO increases. If this is not the case, i.e., the controlled variable decreases, query 330 examines whether difference DMU is greater than 0. This means that it is examined whether the controlled variable of the second control circuit likewise increases. If this is the case, i.e., the first manipulated variable decreases and the second manipulated variable increases, step 340 follows. If query 330 recognizes that second manipulated variable DMO likewise decreases, i.e., it is less than 0, step 350 follows. If query 320 recognizes that the first manipulated variable increases, i.e., difference DMO is greater than 0, query 335 which examines whether the difference DMU of the second manipulated variable is greater than 0 follows. If this is the case, which means that second manipulated variable DMO also increases, step 350 likewise follows. If the second manipulated variable is less than 0, meaning that the first manipulated variable increases and the second manipulated variable drops, step 340 likewise follows.

This means that if the changes in the control interventions are in opposite directions, i.e., one increases and the other decreases, step 340 follows. In other words, the two manipulated variables are added to form starting value M. If the manipulated variables do not change in an opposite direction, meaning that both manipulated variables increase or both manipulated variables decrease, the absolute value of the change in each manipulated variable is determined in step 350. Variable BMO, which corresponds to the absolute variable of variable DMO, and variable BMU, which corresponds to the absolute variable of variable DMU, may be determined. Query 360 examines whether variable BMO is greater than variable BMU. If this is the case, i.e., the absolute value of change in the manipulated variable of the first control circuit is greater than the absolute value of change in the second control circuit, the manipulated variable MO of the first control circuit in step 370 is used for control. At the same time, the I-component of the second control circuit is frozen to its previous value, i.e., the I-component is set at the value MUA.

If variable BMO is not greater than variable BMU, i.e., the absolute value of change in the second manipulated variable is greater than the absolute value of change in the first manipulated variable, the manipulated variable of the second control circuit in step 380 is used for control and I-component 122 of the first control circuit is occupied by variable MOA.

In this advantageous embodiment, the manipulated variable exhibiting the greatest change may be used for control if both governors provide a manipulated variable.

D-component 174 is active only in certain operating states. When D-component 174 is switched off, its intervention is taken over by I-component s 122 and/or 132 in order to ensure a continuous characteristic of manipulated variable M.

Start value generator 180 divides the manipulated variable of D-component 174 into parallel paths.

The procedure is as follows: First, it is examined whether the manipulated variable MD of the D-component, for example, the weighted manipulated variable, is greater or less than 0. If manipulated variable MD is greater than 0, as much MD as permitted by upper limit 0 is allocated to integral component 122. The remainder is allocated to integral component 132.

The control concept described is generally usable on all systems that have a controlling intervention on the manipulated variable of the governor. The procedure is not limited to speed regulation, but may also be used for other regulations. In the reactive current compensating circuit according to block 160, other strategies may also be implemented. For instance, a change-over of the two paths may take place not on the basis of the absolute value of the manipulated variable, but on the basis of the system deviations, for example, the absolute value of the system deviations.

Instabilities in the event of simultaneous intervention of both parallel paths may also be avoided through selected parameters, for example, lower gain factors or through dynamic decoupling.

Instead of two parallel paths, the functionality, for example, when using a computer, may take place through multiple computation of a path using different parameters and/or limiting values.

Other strategies are may also be implemented for the initialization in block 180. Quantity-increasing interventions may be performed in the second path, i.e., in integrator 132. Similarly, torque-reducing interventions may be performed in the first path, for example, in integral I-component 122. The initialization may be performed in such a manner that no path reaches the limitation range.

Instead of the PI-governors, other control structures may be used, for example, structures containing additional components or alternative components.

The above exemplary embodiment involves the torque as the manipulated variable. Instead of this variable, other variables that represent the torque may also be used. For example, the procedure may be performed on the injection amount, the throttle valve position, the angle of ignition for the control rod position or gate valve position in edge-controlled systems.

What is claimed is:

1. A method of controlling an internal combustion engine, comprising:
    specifying, via at least a first governor, a first manipulated variable based on a comparison between a first setpoint value and an actual value; and
    specifying, via at least a second governor, a second manipulated variable based on a comparison between a second setpoint value and the actual value;
    wherein the first manipulated variable is limited to a first manipulating range and the second manipulated variable is limited to a second manipulating range, and
    wherein the first manipulated variable is decreased and the second manipulated variable is increased.

2. The method of claim 1, wherein the speed of the internal combustion engine is controlled.

3. The method of claim 1, wherein the first setpoint value is not less than the second setpoint value.

4. The method of claim 1, wherein if both governors provide the manipulated variables, one of the manipulated variables having the greater absolute-value is used in the controlling.

5. The method of claim 1, wherein one of the manipulated variables having the smaller absolute-value is frozen.

6. The method of claim 1, wherein, in certain operating states, a manipulated variable is influenced by a governor exhibiting at least a differential behavior.

7. A device for controlling an internal combustion engine, comprising:
    at least one first governor configured to specify a first manipulated variable based on a comparison between a first setpoint value and an actual value;
    at least one second governor, configured to specify a second manipulated variable based on a comparison between a second setpoint value and the actual value; and
    a limiter arrangement to limit the first manipulated variable to a first manipulating range and the second manipulated variable to a second manipulating range; and
    wherein the first manipulated variable is decreased and the second manipulated variable is increased.

8. The device of claim 7, wherein the speed of the internal combustion engine is controlled.

9. The device of claim 7, further comprising:
    a program code arrangement to execute a computer program to control the at least one first governor and the at least one second governor, wherein the program code arrangement includes a control unit for an internal combustion engine.

10. A computer program product, comprising:
    program code stored on a computer-readable storage medium, and executable on a computer to perform the following:
        specify, via at least a first governor, a first manipulated variable based on a comparison between a first setpoint value and an actual value; and
        specify, via at least a second governor, a second manipulated variable based on a comparison between a second setpoint value and the actual value;
        wherein the first manipulated variable is limited to a first manipulating range and the second manipulated variable is limited to a second manipulating range, and
        wherein the first manipulated variable is decreased and the second manipulated variable is increased.

11. A digital storage medium, comprising:
    electronically readable control signals cooperable with a programmable computer system to perform the following:
        specify, via at least a first governor, a first manipulated variable based on a comparison between a first setpoint value and an actual value; and
        specify, via at least a second governor, a second manipulated variable based on a comparison between a second setpoint value and the actual value;
        wherein the first manipulated variable is limited to a first manipulating range and the second manipulated variable is limited to a second manipulating range, and
        wherein the first manipulated variable is decreased and the second manipulated variable is increased.

12. The digital storage medium of claim 11, wherein the digital storage medium is a diskette.

13. A method of controlling an internal combustion engine, comprising:
    specifying, via at least a first governor, a first manipulated variable based on a comparison between a first setpoint value and an actual value; and
    specifying, via at least a second governor, a second manipulated variable based on a comparison between a second setpoint value and the actual value;
    wherein the first manipulated variable is limited to a first manipulating range and the second manipulated variable is limited to a second manipulating range, and
    wherein if both governors provide the manipulated variables, one of the manipulated variables having the greater absolute-value is used in the controlling.

14. A method of controlling an internal combustion engine, comprising:
    specifying, via at least a first governor, a first manipulated variable based on a comparison between a first setpoint value and an actual value; and
    specifying, via at least a second governor, a second manipulated variable based on a comparison between a second setpoint value and the actual value;
    wherein the first manipulated variable is limited to a first manipulating range and the second manipulated variable is limited to a second manipulating range, and
    wherein one of the manipulated variables having the smaller absolute-value is frozen.

* * * * *